(12) United States Patent
Gomez et al.

(10) Patent No.: US 12,326,946 B2
(45) Date of Patent: Jun. 10, 2025

(54) PRIVACY-PRESERVING DATA AND PROCESS ANALYTICS

(71) Applicant: SAP SE, Walldorf (DE)

(72) Inventors: Laurent Gomez, Pegomas (FR);
Cedric Hebert, Mouans Sartoux (FR)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 18/319,151

(22) Filed: May 17, 2023

(65) Prior Publication Data
US 2024/0289471 A1 Aug. 29, 2024

Related U.S. Application Data

(60) Provisional application No. 63/486,979, filed on Feb. 25, 2023.

(51) Int. Cl.
*G06F 21/60* (2013.01)
*G06F 21/62* (2013.01)

(52) U.S. Cl.
CPC ........ G06F 21/604 (2013.01); G06F 21/6236 (2013.01); *G06F 2221/2107* (2013.01)

(58) Field of Classification Search
CPC .............. G06F 21/604; G06F 21/6236; G06F 2221/2107
USPC ......................................................... 726/27
See application file for complete search history.

(56) References Cited

U.S. PATENT DOCUMENTS

| | | | |
|---|---|---|---|
| 11,868,486 B2 * | 1/2024 | Ortiz .................... | H04L 9/3271 |
| 11,949,794 B2 * | 4/2024 | Brandenburger ..... | H04L 63/123 |
| 2019/0342085 A1 * | 11/2019 | Kube .................... | H04L 9/3247 |
| 2019/0362083 A1 * | 11/2019 | Ortiz .................... | H04L 9/3247 |
| 2020/0402625 A1 * | 12/2020 | Aravamudan ...... | G06F 21/6245 |
| 2021/0174911 A1 * | 6/2021 | Sharda ................ | G06Q 10/103 |
| 2022/0360450 A1 * | 11/2022 | Brandenburger ..... | H04L 9/0894 |
| 2023/0230091 A1 * | 7/2023 | Vaughn .............. | G06Q 20/4016 705/71 |

(Continued)

FOREIGN PATENT DOCUMENTS

WO    WO-2022109848 A1 *  6/2022  ............. G06F 16/27

OTHER PUBLICATIONS

Bhatotia, Pramond et al., "Steel: Composable Hardware-based Stateful and Randomised Functional Encryption", In ACR International Conference on Public-Key Cryptography, pp. 709-736. Springer, 2021, (pp. 1-46, 46 total pages).

(Continued)

*Primary Examiner* — Samson B Lemma
(74) *Attorney, Agent, or Firm* — Buckley, Maschoff & Talwalkar LLC

(57) ABSTRACT

A system and method include execution of program code within an enclave of a trusted execution environment to receive a query identifying an analytic, retrieve an analytic profile corresponding to the analytic from a first distributed ledger, the analytic profile identifying input data and including first code executable to compute the analytic from the input data, retrieve the input data from a second distributed ledger, retrieve cryptographic information associated with the retrieved input data from one or more other enclaves of the trusted execution environment, decrypt the retrieved input data using the cryptographic information, and execute the first code to compute the analytic from the decrypted input data.

19 Claims, 9 Drawing Sheets

(56) References Cited

U.S. PATENT DOCUMENTS

2024/0062860 A1* 2/2024 Aravamudan .......... G06F 21/64
2024/0184898 A1* 6/2024 Ortiz ..................... H04L 9/3247

OTHER PUBLICATIONS

Fisch, Ben A et al., "Iron: Functional Encryption using Intel SGX", In Proceedings of the 2017 ACM SIGSAC Conference on Computer and Communications Security, 2017, (pp. 1-37, 37 total pages).
Microsoft, "Multiparty computing architecture design", downloaded from URL:https://learn.microsoft.com/en-us/azure/architecture/guide/blockchain/multiparty-compute, [Retrieved on May 17, 2023], 7pgs.

* cited by examiner

| Analytic ID | #AveragePOAmount |
| --- | --- |
| Required Input | PO Amount of all transactions between $Supplier_B$ and Public $Actor_A$ |
| Pseudocode | Average(required_input) |
| Access Control Policy | None |

| Config Info ID | #JKLJ423KLJ |
| --- | --- |
| Data Type | PO Amount |
| Algorithm | AES |
| Key Size | 256 Bits |
| Key | AB#F127... |

| | 900 |
|---|---|
| Purchase Order ID | #JKLJ423KLJ |
| Supplier Reference | #LKJF02LASKLJ |
| Quantity | 20 |
| Unitary Price | 2 Euros |
| Amount | 20 Euros |

FIG. 9

| Data Type | Encryption Profile | 1000 |
|---|---|---|
| Purchase Order ID | None | |
| Supply Reference | P0-2 | |
| Quantity | P0-1 | |
| Unitary Price | P0-1 | |
| Amount | P0-0 | |

FIG. 10

| | 1100 |
|---|---|
| Purchase Order ID | #JKLJ423KLJ |
| Supplier Reference | <encrypted> |
| Quantity | <encrypted> |
| Unitary Price | <encrypted> |
| Amount | <encrypted> |

FIG. 11

PRIVACY-PRESERVING DATA AND PROCESS ANALYTICS

CROSS-REFERENCE TO RELATED APPLICATIONS

The present application claims priority to U.S. Provisional Patent Application No. 63/486,979, filed Feb. 25, 2023, the contents of which are incorporated herein by reference for all purposes.

BACKGROUND

Modern organizations often utilize a system landscape consisting of distributed computing systems providing various computing services. For example, in order to implement desired functionality, an organization may deploy services within computing systems located in on-premise data centers (which themselves may be located in disparate geographic locations) and within data centers provided by one or more infrastructure as-a-service (IaaS) providers. Any number of these computing systems may comprise cloud-based systems (e.g., providing services using scalable-on-demand virtual machines).

Orchestrated cooperation between system landscapes of different organizations is increasingly common. For example, a government entity may develop a streamlined public procurement process in collaboration with several private companies. Each participant in such a process agrees to an overall architecture and flow and to their respective responsibilities within the process.

It is desirable to monitor such a cross-organization process and to compute analytics which relate to the process and the various substeps of the process. Examples of analytics include financial data, product recommendations, predictive maintenance schedules, process metrics for identifying bottlenecks and potential process improvements, and metrics for evaluating conformance with contractual and legal obligations.

Computation of such analytics is difficult due to the complexity of the architecture and process and the heterogeneity of the collaborating computing systems. In particular, the computations typically require transaction data of many transactions executed within and between the computing systems, but the above-mentioned complexity and heterogeneity hinder the transparency and traceability of the transactions. Transparency and traceability are also in direct conflict with an organization's natural tendency to maintain secrecy, its obligations under applicable data protection regulations, and its contractual obligations. These constraints therefore disrupt the main objective of cross-organization collaborations, which is to minimize risks and costs, and may result in additional conflict management costs.

What is needed is a privacy-preserving analytics framework which may be used in conjunction with sensitive data along cross-organizational transactions. Such a framework may provide efficient generation of data and process analytics while maintaining secrecy of private information and processes, resulting in reduced costs and risks.

BRIEF DESCRIPTION OF THE DRAWINGS

FIG. 9 is a tabular representation of transaction data according to some embodiments.

FIG. 10 is a tabular representation of a data sensitivity map according to some embodiments.

FIG. 11 is a tabular representation of encrypted transaction data according to some embodiments.

DETAILED DESCRIPTION

The following description is provided to enable any person in the art to make and use the described embodiments. Various modifications, however, will be readily-apparent to those in the art.

Some embodiments provide privacy-preserving data and process analytics on sensitive shared data of cross-organizational transactions using distributed ledger technologies and hardware-assisted Privacy Enhancing Technology (e.g., Trusted Execution Environment). Specifically, some embodiments provide the capacity to securely compute analytics based on encrypted data.

Distributed ledger technologies (e.g., Blockchain, Smart Contracts, Ricardian Contracts) provide transparency and traceability of transaction data in a cross-organization collaboration, while Privacy Enhancing Technology provides privacy-preserving computation of analytics based on the transaction data. More specifically, process participants encrypt their transaction data and store it in a common distributed ledger, and code is executed in a secure hardware environment to determine the transaction data required to compute an analytic, to retrieve the required encrypted transaction data from the distributed ledger, to decrypt the data using cryptographic information stored in the secure hardware environment by the participants, and to compute the analytic from the decrypted transaction data.

Existing Privacy Enhancing Technologies such as a trusted execution environment can theoretically evaluate any function within an isolated secure enclave but rely on a trusted third party for key management and function access control and are also vulnerable to side channel attacks. According to some embodiments, key management and access control are addressed in a decentralized matter. In particular, each process participant is responsible for key management (e.g., using remote/local attestation) and for defining access control policy and deployment (e.g., using blockchain/majority voting consensus). Moreover, the risk of side channel attacks may be reduced by utilizing cloud-based trusted execution environments, which limits physical access to the hardware and system kernel.

Figure 1:
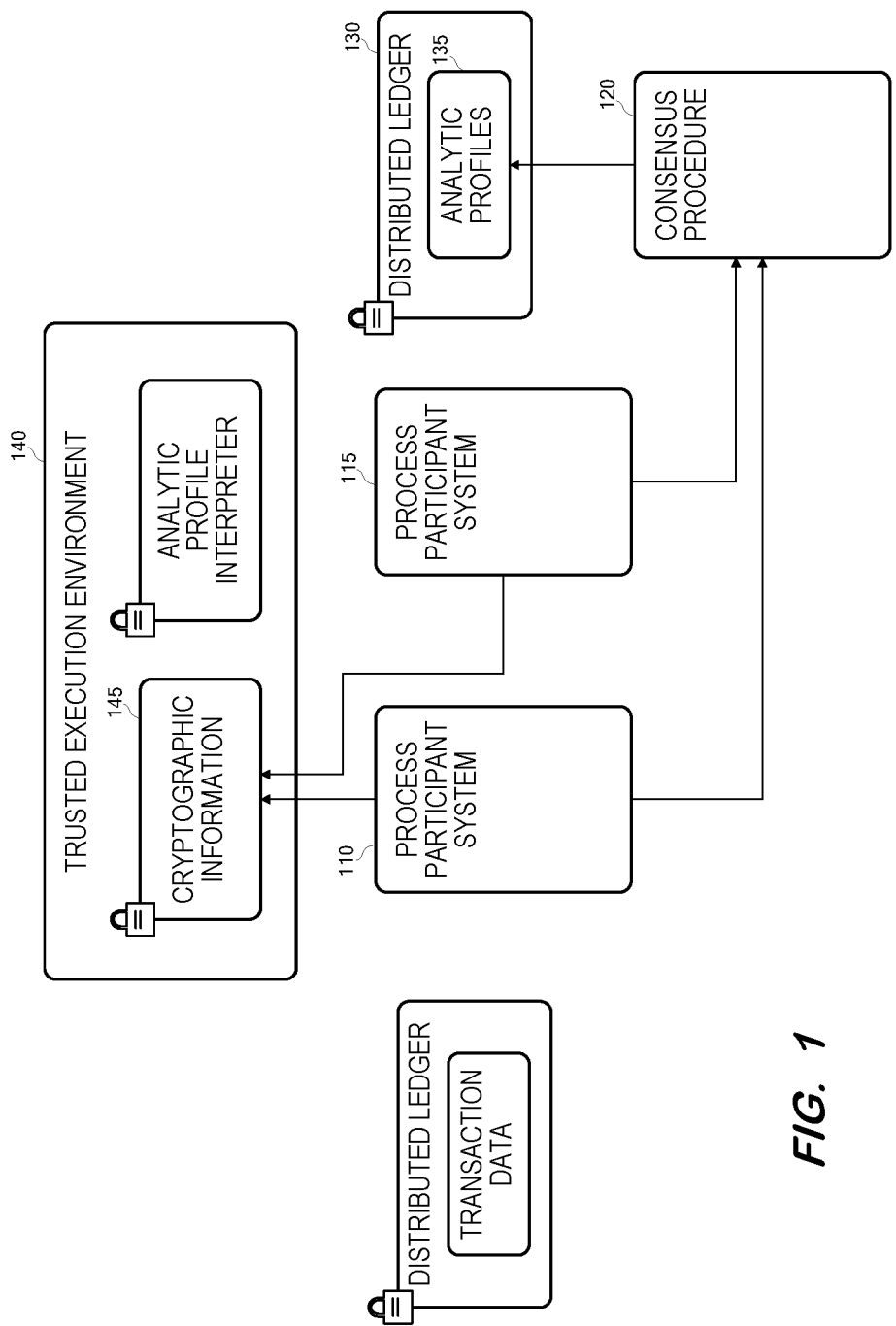
FIG. 1 illustrates storage of analytic profiles and cryptographic information within an architecture according to some embodiments.

FIG. 1 illustrates an architecture according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Each of process participant systems 110, 115 may comprise any number of hardware and software components which form the entirety, or a portion of, a system landscape operated by a respective organization or entity. Each of process participant systems 110, 115 may comprise disparate cloud-based services, a single computer server, a cluster of servers, and any other combination that is or becomes known. All or a part of participant systems 110, 115 may comprise Infrastructure-as-a-Service (IaaS), Platform-as-a-Service (PaaS) and/or Software-as-a-Service (SaaS) offerings owned and managed by a different entity as is known in the art.

Each of process participant systems 110, 115 provides one or more functions which are used in a particular process. The one or more functions may be provided by one or more applications executing within participant systems 110, 115. The applications may be standalone, distributed, or any other type of applications that are or become known.

According to one non-exhaustive example, the particular process may be a public procurement process involving three independent stakeholders: a Public Actor, a Supplier, and a Transport company. The Public Actor requests supplies via a Purchase Order sent to the Supplier. The Supplier prepares requested supplies, and delegates delivery to the Transport company. After validation, the Public Actor pays the Supplier.

Legal contracts may define the interactions between the stakeholders. Contracts include terms and conditions, such as delivery deadlines, payment requirements, and agreed-upon prices. Penalties may be levied if a stakeholder does not fulfill its obligations under the applicable contracts.

From a transparency standpoint, the Public Actor would like to demonstrate efficient and optimized spending of public funds which maximizes services to citizens. This may be demonstrated using analytics relating to obligation management (e.g., evaluation of contractual obligations, triggering of late delivery/payment penalties, computation of applied penalties, amount of penalties), data and process mining (e.g., data mining, percentage of late delivery, percentage of late payment, ratio between global budget spent and late payment penalties), and process mining (e.g., average time for payment, average time for delivery, distribution of transaction state per supplier/per product category).

From a privacy-preserving standpoint, stakeholders should be compliant with the applicable data protection regulations (e.g., GPDR, HIPAA) and contractual obligations. Examples of sensitive data which should be protected from disclosure may include but are not limited to contractual data (e.g., a penalty formula, delivery/payment delays, negotiated supply prices, unitary prices, delivery details (i.e., address, contact name, email, phone number)), transactional data (e.g., purchase order details (i.e., quantity, amount), transaction volume, time/energy/carbon footprint spent on each transaction), and master data (e.g., purchase order unitary prices, delivery details, contact details (i.e., name, phone, address)).

The process is initially modeled, with different steps of the process being assigned to different organizations (i.e., to different process participant systems). Process participant systems 110, 115 execute consensus procedure 120 (e.g., a series of meetings) to determine each desired analytic and the data required for evaluating each desired analytic. This determined information is then stored within distributed ledger 130 as analytical profiles 135. Advantageously, storage of analytical profiles 135 in distributed ledger renders analytical profiles 135 immutable.

Distributed ledger 130 is a data store that is synchronized and accessible across different sites and geographies by multiple participants, in a manner that eliminates the need for a central authority to guard against manipulation of the data stored therein. Distributed ledger 130 may be implemented in any manner that is or becomes known. According to some embodiments, distributed ledger 130 may be written-to via consensus procedure 120 and read by C.

A trusted execution environment is a secure area of a main processor which guarantees the protection of code and data loaded inside with respect to confidentiality, data integrity and code integrity. Data integrity prevents unauthorized entities from outside the environment from altering data and code integrity prevents code in the environment from being replaced or modified by unauthorized entities. Trusted execution environment 140 may allow users to allocate private regions of memory, or enclaves, which are protected from processes running at higher privilege levels.

Each of participant systems 110 and 115 provides cryptographic information 145 to trusted execution environment 140, for example by allocating corresponding enclaves within environment 140. In one example, cryptographic information 145 may comprise an encryption profile associated with a particular data type and persisted by system 110 within an individual enclave of trusted execution environment 140. The encryption profile may include an encryption type and a key. As will be discussed below, during the subsequent evaluation of an analytic described in an analytic profile 135, trusted execution environment 140 may use the key and encryption type to decrypt data of the particular data type which was previously encrypted by the system 110. The foregoing arrangement may prevent the disclosure of sensitive data in some embodiments.

Figure 2:
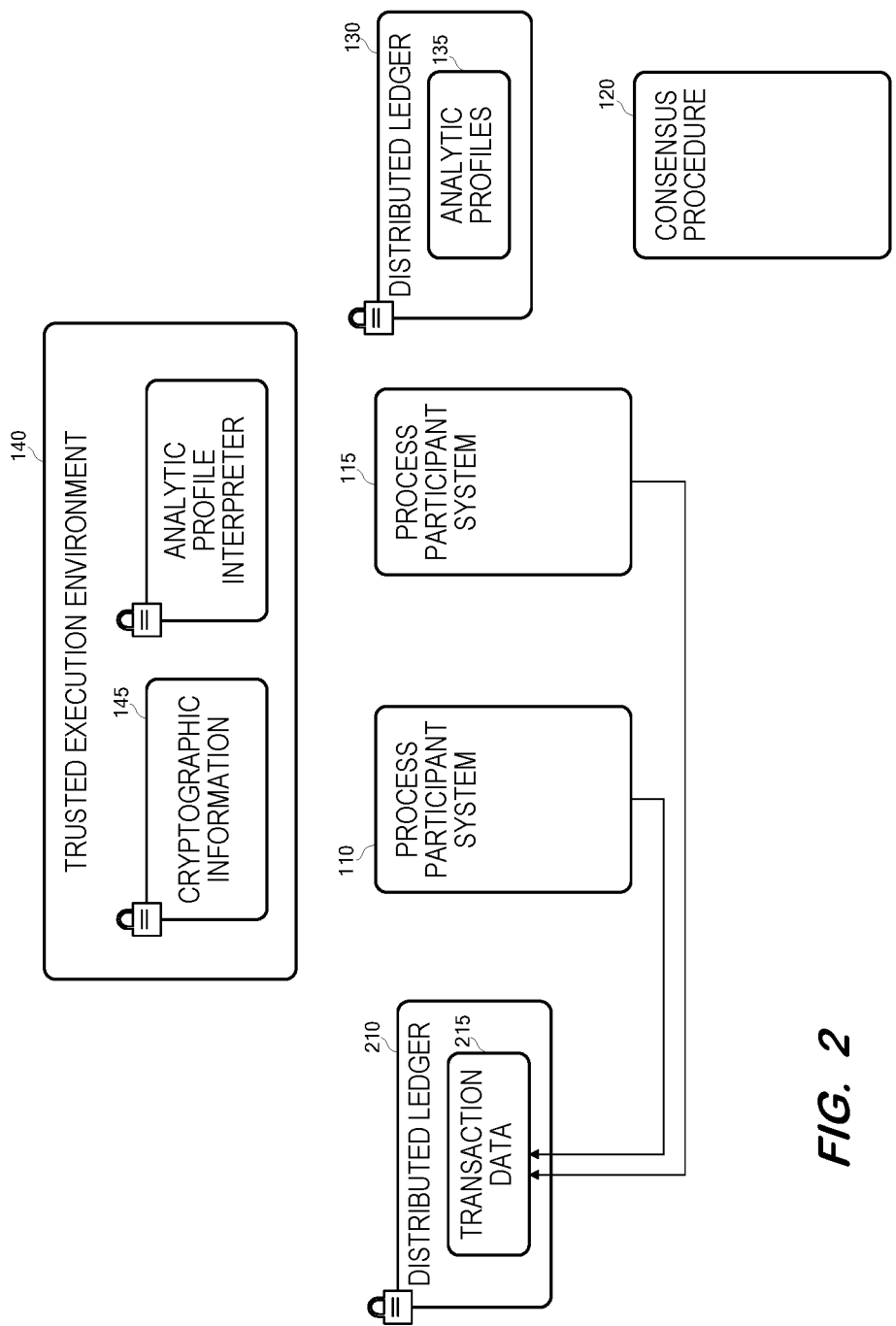
FIG. 2 illustrates storage of encrypted transaction data within an architecture during process execution according to some embodiments.

Systems 110 and 115 generate transaction data during execution of the collaborative process. FIG. 2 depicts the writing of transaction data 215 to distributed ledger 210 by systems 110 and 115 during execution of the collaborative process. Distributed ledger 210 is therefore configured to allow systems 110 and 115 write access and provides immutability to transaction data 215.

Each of systems 110 and 115 may determine their respective transaction data to be written to transaction data 215 based on the data needed to compute the analytics of analytic profiles 135. Moreover, each of systems 110 and 115 may encrypt some or all of their respective transaction data prior to writing it to distributed ledger 210. For example, if a process participant system is to write data of a given data type is to ledger 210, the process participant first encrypts the data using the encryption type specified in the cryptographic information 145 for the given data type and in a manner that allows decryption thereof using the key included in the cryptographic information 145 for the given data type.

Figure 3:
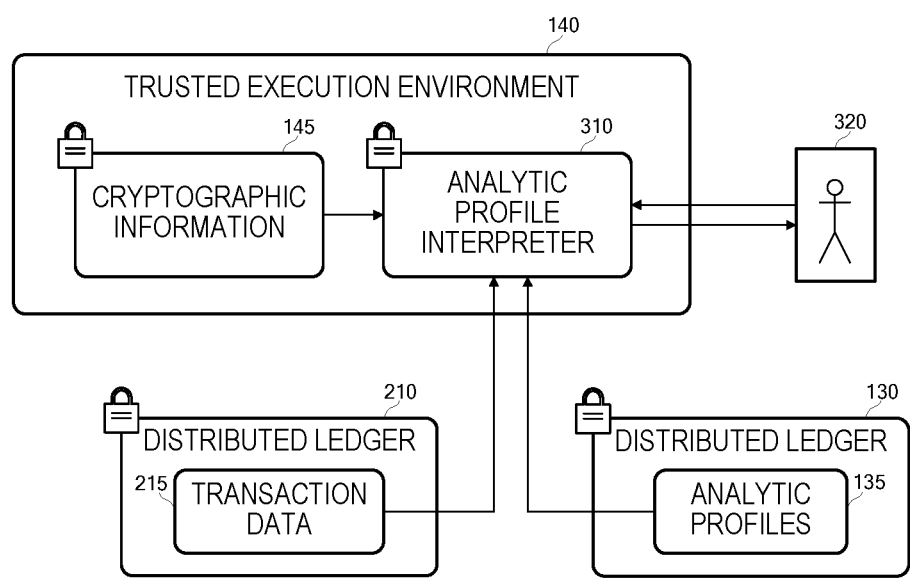
FIG. 3 illustrates computation of analytics based on stored analytic profiles, encrypted transaction data and cryptographic information according to some embodiments.

FIG. 3 illustrates servicing of a query received from querier 320 by analytic profile interpreter 310. Analytic profile interpreter 310 may reside in a secure enclave of trusted execution environment 140 which is separate from the enclaves including cryptographic information 145. The query may request computation of an analytic corresponding to a particular one of analytic profiles 135.

Assuming querier 320 is suitably authorized, analytic profile interpreter 310 executes to retrieve the particular corresponding one of analytic profiles 135 from ledger 130 and determines the required transaction data therefrom. Analytic profile interpreter 310 then retrieves the required (and most possibly encrypted) transaction data from transaction data 215 of distributed ledger 210. Using local attestation, analytic profile interpreter 310 retrieves any decryption keys corresponding to the retrieved encrypted transaction data from cryptographic information 145 and decrypts the encrypted transaction data.

The retrieved analytic profile 135 includes code for computing the subject analytic. Interpreter 310 securely executes the code to compute the analytic based on the decrypted transaction data. The result is then returned to querier 320. In some embodiments, the result is encrypted using cryptographic information provided by querier 320 along with the original query.

Figure 4:
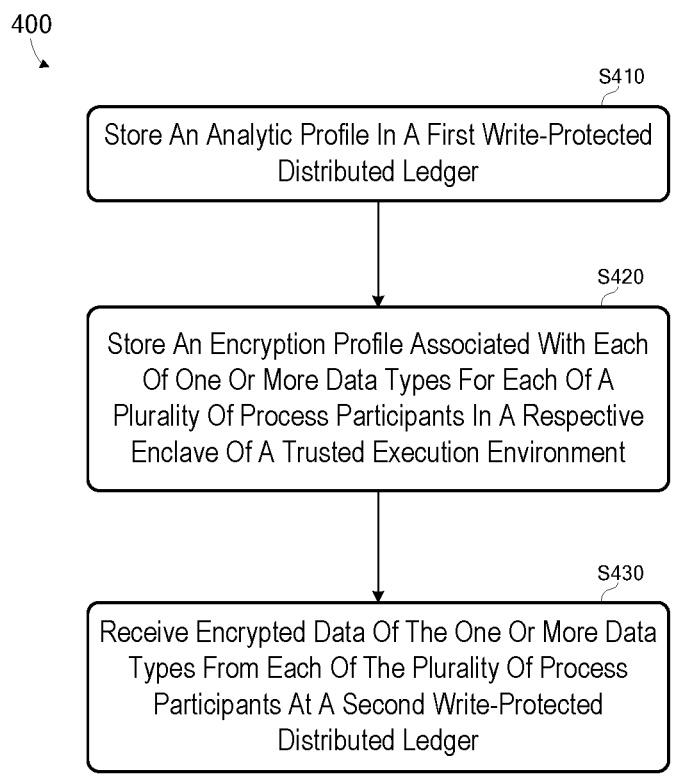
FIG. 4 is a flow diagram of a process to manage analytic profiles, cryptographic information and encrypted transaction data within an architecture according to some embodiments.

FIG. 4 is a flow diagram of process 400 according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

A collaborative process is initially modeled prior to process 400. Different steps of the process are assigned to different organizations (i.e., to different process participant systems).

An analytic profile is stored in a first write-protected distributed ledger at S410. In some embodiments, the process participants agree to the contents of the analytic profile prior to storage of the profile on the distributed ledger. This agreement and storage may be facilitated by technologies such as but not limited to Quorum blockchain, which enables the deployment of a profile on a distributed ledger as an immutable block based on a majority voting consensus mechanism. The first distributed ledger may be configured for write access by the consensus mechanism.

Figures 5, 6:
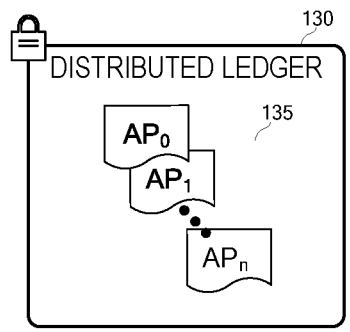
FIG. 5 illustrates a plurality of analytic profiles stored within a distributed ledger according to some embodiments.
FIG. 6 is a tabular representation of an analytic profile according to some embodiments.

FIG. 5 illustrates a plurality of analytic profiles 135 stored within distributed ledger 130 according to some embodiments. Each of analytic profiles 135 may be associated with a different analytic, and one or more may be associated with different collaborative processes. FIG. 6 is a tabular representation of analytic profile 600 according to some embodiments. Profile 600 includes an ID identifying an analytic, a list of input required to compute the analytic, pseudocode executable to perform the computation, and an optional access control policy for restricting access to the analytic.

At S420, and for each of a plurality of process participants, an encryption profile associated with each of one or more data types is stored in a respective enclave of a trusted execution environment. For example, a process participant may read from the first distributed ledger to determine which of its transaction data are needed to compute the analytics profiled therein. For each data type (or group of data types) of this transaction data, the process participant may generate an enclave (e.g., a binary file) and deploy the enclave a trusted execution environment using remote attestation over a secure channel.

A participant system may determine an encryption profile associated with a given data type based on internal security information. The internal security information may specify the level of confidentiality (and/or the encryption protocol) to be associated with each data type (or group of data types) of the transaction data used or generated by the participant system.

Figures 7, 8:
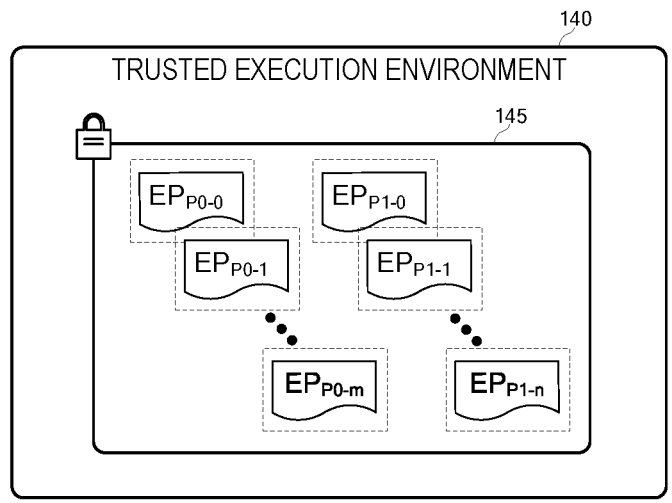
FIG. 7 illustrates a plurality of participant- and data type-specific encryption profiles stored as enclaves within a trusted execution environment according to some embodiments.
FIG. 8 is a tabular representation of a participant- and data type-specific encryption profile according to some embodiments.

FIG. 7 illustrates a plurality of participant- and data type-specific encryption profiles 145 stored as enclaves within trusted execution environment 140 according to some embodiments. In the illustrated example, environment 140 stores enclaves including encryption profiles (EPs) 0 through m of participant P0 and EPs 0 through n of participant P1. FIG. 8 is a tabular representation of participant- and data type-specific encryption profile 800 according to some embodiments. Profile 800 specifies an ID, a data type, an encryption algorithm, a key size and a key which may be used to decrypt encrypted data of the specified data type.

Next, at S430, encrypted data of the one or more data types is received from each of the plurality of process participants at a second write-protected distributed ledger. Accordingly, S430 occurs during execution of the above-mentioned collaborative process. The process participants may determine their respective transaction data to write to the second write-protected distributed ledger based on the required data specified in the stored analytic profiles. The second write-protected distributed ledger is therefore configured to allow each of the process participants write access to immutably write their transaction data thereto. FIG. 9 is a tabular representation of transaction data 900 generated during the process and including several data types according to some embodiments.

In some embodiments of S430, a participant system identifies transaction data to be written to the second distributed ledger and determines an encryption profile for each data type of the transaction data. FIG. 10 is a tabular representation of data sensitivity map 1000 of a process participant which associates data types with respective encryption profiles. S430 may therefore include determining an encryption profile for each data type of transaction data 900 using map 1000 and encrypting the data of each data type based on its encryption profile. FIG. 11 illustrates tabular representation 1100 of thusly-encrypted transaction data 900 according to some embodiments.

The encryption profile associated with a data type in map 1000 corresponds to the encryption profile associated with the data type in the trusted execution environment. Accordingly, data encrypted using an encryption profile specified in map 1000 may be decrypted using the information of the corresponding encryption profile stored in the trusted execution environment.

Figure 12:
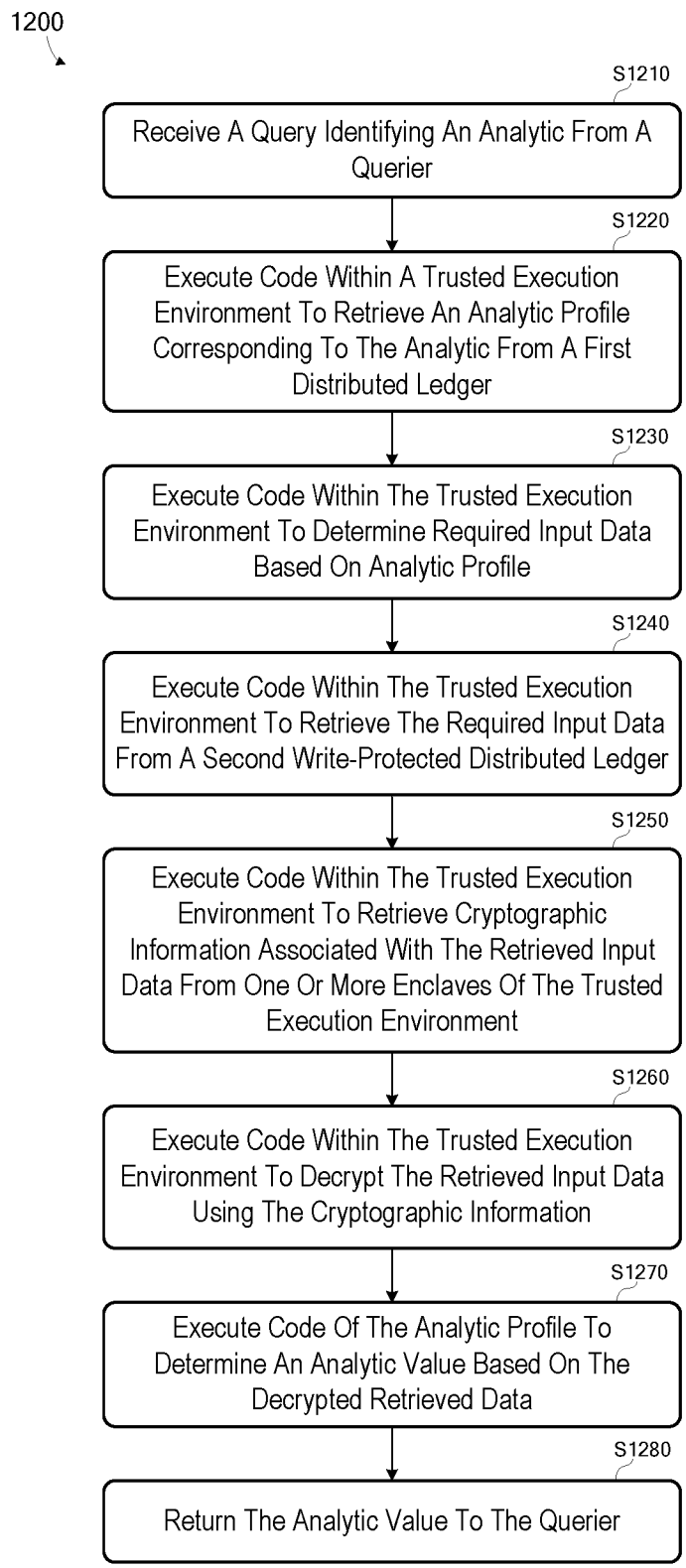
FIG. 12 is a flow diagram of a process to compute a value of an analytic based on a stored analytic profile, encrypted transaction data and cryptographic information according to some embodiments.

FIG. 12 is a flow diagram of process 1200 to compute a value of an analytic based on a stored analytic profile, encrypted transaction data and cryptographic information according to some embodiments.

A query identifying an analytic is received from a querier at S1210. The query may be received by an analytic profile interpreter residing in a secure enclave of the trusted execution environment which is separate from the enclaves of the trusted execution environment in which the encryption profiles reside. The query may provide an analytic ID identifying one of the stored analytic profiles and authentication information via a suitable API of the analytic profile interpreter. The query may provide an encryption key for encrypting a resulting analytic value.

Code (e.g., of the API) is executed at S1220 within the trusted execution environment to retrieve an analytic profile corresponding to the identified analytic from the first distributed ledger. Any access control information of the profile is used to determine, based on querier authentication, whether access should be granted to the querier. If so, code of the analytic profile interpreter is executed at S1230 within the trusted execution environment to determine the required input data specified by the analytic profile.

The analytic profile interpreter retrieves the required input data from the second distributed ledger at S1240. Next, at S1250, cryptographic information associated with the retrieved input data is retrieved from one or more enclaves of the trusted execution environment. For example, the analytic profile interpreter may determine the data types of the encrypted transaction data and the participant system which stored the transaction data to request, using local attestation, corresponding encryption profiles from their secure enclaves of the trusted execution environment. The analytic profile interpreter decrypts the retrieved input data using the corresponding encryption profiles at $1260 to generate decrypted transaction data.

At S1270, code of the identified analytic profile is executed to determine an analytic value based on the decrypted retrieved data. The analytic value is then returned to querier at S1280. The returned result may be encrypted using cryptographic information which was provided by the querier along with the original query.

Figure 13:
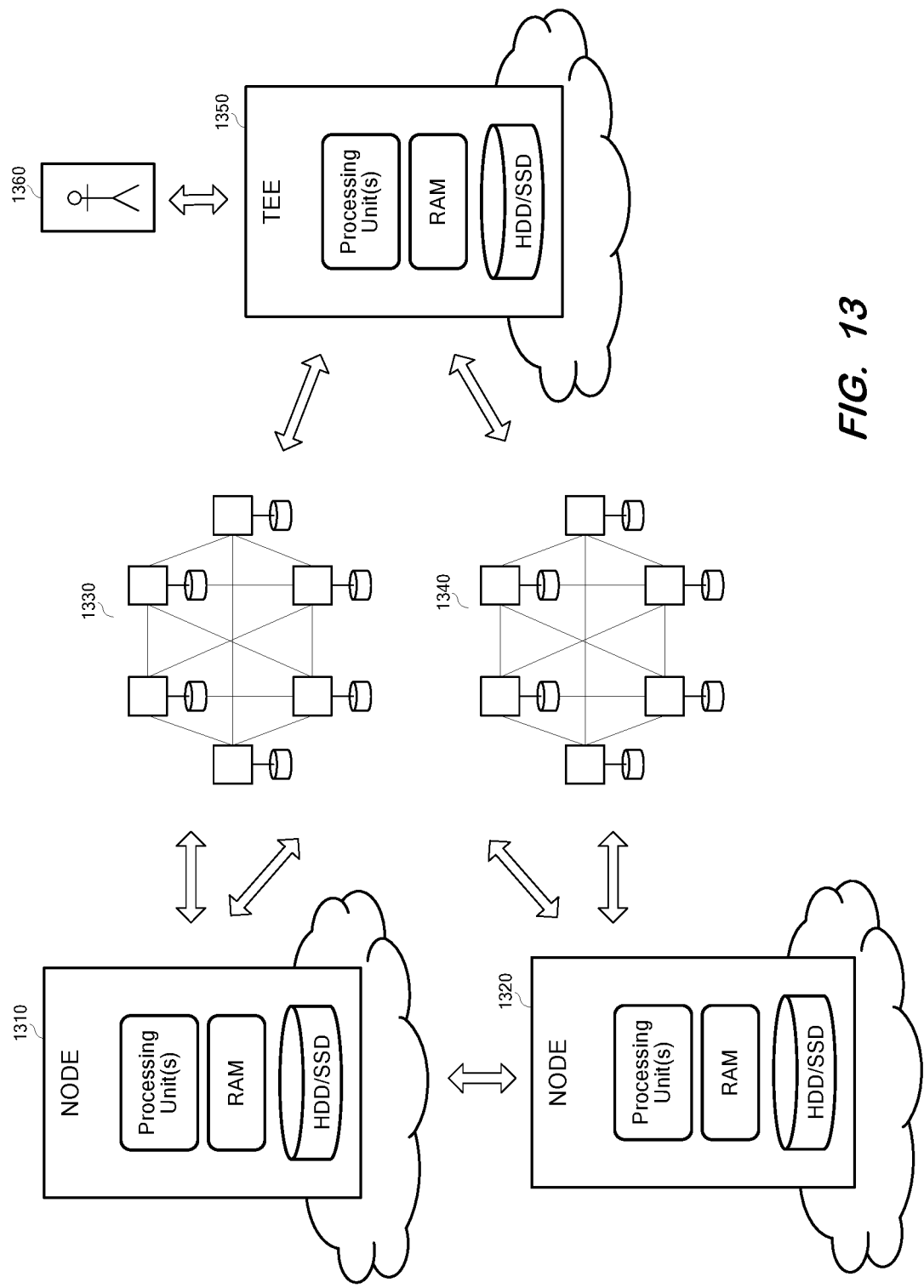
FIG. 13 is a block diagram of a cloud-based implementation according to some embodiments.

FIG. 13 is a block diagram of a cloud-based implementation according to some embodiments. The illustrated components may comprise cloud-based resources residing in one or more public clouds providing self-service and immediate provisioning, autoscaling, security, compliance and identity management features.

Nodes 1310 and 1320 may comprise servers or virtual machines of respective Kubernetes clusters, but embodiments are not limited thereto. Nodes 1310 and 1320 may support containerized applications which provide one or more services to users. As described above, nodes 1310 and 1320 may read from distributed ledger 1330 storing analytic profiles and write their encrypted transaction data to distributed ledger 1340.

Trusted execution environment 1350 may comprise a system providing confidential computing characteristics. In response to queries received from querier 1360, trusted execution environment 1350 executes code to retrieve an analytic profile from distributed ledger 1330, to retrieve encrypted transaction data required by the analytic profile from distributed ledger 1340, to decrypt the transaction data using cryptographic information stored in trusted execution environment 1350, to compute an analytic based on the decrypted transaction data and code of the analytic profile, and to provide the computed analytic to querier 1360.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code; and
at least one processing unit to execute the processor-executable program code within an enclave of a trusted execution environment to cause the system to:
receive a query identifying an analytic;
retrieve an analytic profile corresponding to the analytic from a first distributed ledger, the analytic profile identifying input data and including first code executable to compute the analytic from the input data;
retrieve the input data from a second distributed ledger;
retrieve cryptographic information associated with the retrieved input data from one or more other enclaves of the trusted execution environment using local attestation between the enclave of the trusted execution environment and the one or more other enclaves of the trusted execution environment;
decrypt the retrieved input data using the cryptographic information; and
execute the first code to compute the analytic from the decrypted input data.

2. A system according to claim 1, wherein the retrieved cryptographic information includes a first decryption key associated with a first data type of the input data and a second decryption key associated with a second data type of the input data.

3. A system according to claim 2, wherein the first decryption key and the second decryption key were stored in the one or more enclaves using remote attestation.

4. A system according to claim 1, wherein the input data comprises first input data stored in the second distributed ledger by a first organization and second input data stored in the second distributed ledger by a second organization.

5. A system according to claim 4, wherein the retrieved cryptographic information includes a first decryption key associated with a first data type of the first input data and a second decryption key associated with a second data type of the second input data.

6. A system according to claim 5, wherein the retrieved cryptographic information includes a third decryption key associated with a third data type of the first input data.

7. A method for executing within an enclave of a trusted execution environment, the method comprising:
receiving a query identifying an analytic; and
in response to receipt of the query:
retrieving an analytic profile corresponding to the analytic from a first distributed ledger, the analytic profile identifying input data and including first code executable to compute the analytic from the input data;
retrieving the input data from a second distributed ledger;
retrieving cryptographic information associated with the retrieved input data from one or more other enclaves of a trusted execution environment using local attestation between the enclave of the trusted execution environment and the one or more other enclaves of the trusted execution environment;
decrypting the retrieved input data using the cryptographic information;
executing the first code to compute the analytic from the decrypted input data; and
returning the computed analytic.

8. A method according to claim 7, wherein the retrieved cryptographic information includes a first decryption key associated with a first data type of the input data and a second decryption key associated with a second data type of the input data.

9. A method according to claim 8, wherein the first decryption key and the second decryption key were stored in the one or more enclaves using remote attestation.

10. A method according to claim 7, wherein the input data comprises first input data stored in the second distributed ledger by a first organization and second input data stored in the second distributed ledger by a second organization.

11. A method according to claim 10, wherein the retrieved cryptographic information includes a first decryption key associated with a first data type of the first input data and a second decryption key associated with a second data type of the second input data.

12. A method according to claim 11, wherein the retrieved cryptographic information includes a third decryption key associated with a third data type of the first input data.

13. A non-transitory computer-readable medium storing processor-executable program code, the program code executable by a computing system within an enclave of a trusted execution environment to:
receive a query identifying an analytic;
retrieve an analytic profile corresponding to the analytic from a first distributed ledger, the analytic profile identifying input data and including first code executable to compute the analytic from the input data;
retrieve the input data from a second distributed ledger;
retrieve cryptographic information associated with the retrieved input data from one or more other enclaves of a trusted execution environment using local attestation between the enclave of the trusted execution environment and the one or more other enclaves of the trusted execution environment;
decrypt the retrieved input data using the cryptographic information; and
execute the first code to compute the analytic from the decrypted input data.

14. A non-transitory computer-readable medium according to claim 13, wherein the retrieved cryptographic information includes a first decryption key associated with a first data type of the input data and a second decryption key associated with a second data type of the input data.

15. A non-transitory computer-readable medium according to claim 14, wherein the first decryption key and the second decryption key were stored in the one or more enclaves using remote attestation.

16. A non-transitory computer-readable medium according to claim 13, wherein the input data comprises first input data stored in the second distributed ledger by a first organization and second input data stored in the second distributed ledger by a second organization.

17. A non-transitory computer-readable medium according to claim 16, wherein the retrieved cryptographic information includes a first decryption key associated with a first data type of the first input data and a second decryption key associated with a second data type of the second input data.

18. A non-transitory computer-readable medium according to claim 17, wherein the retrieved cryptographic information includes a third decryption key associated with a third data type of the first input data.

19. A non-transitory computer-readable medium according to claim 13, wherein the program code is executable within the trusted execution environment.

* * * * *